Figure 1:
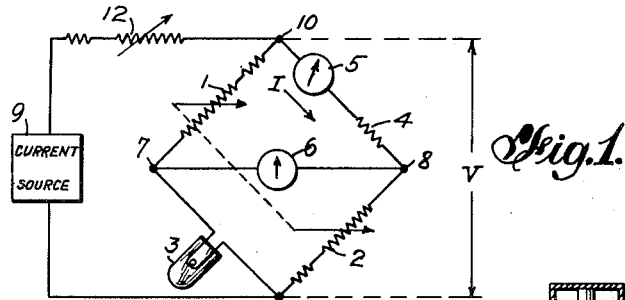

Jan. 31, 1950     W. A. MONTGOMERY     2,495,752
ARRANGEMENT FOR MEASURING ELECTRIC POWER
Filed June 30, 1945

INVENTOR
WILLIAM A. MONTGOMERY
BY R.P. Morris
ATTORNEY

Patented Jan. 31, 1950

2,495,752

UNITED STATES PATENT OFFICE 2,495,752

ARRANGEMENT FOR MEASURING ELECTRIC POWER

William Alan Montgomery, London, England, assignor, by mesne assignments, to International Standard Electric Corporation, New York, N. Y., a corporation of Delaware Application June 30, 1945, Serial No. 602,449
In Great Britain June 16, 1944

Section 1, Public Law 690, August 8, 1946
Patent expires June 16, 1964

7 Claims. (Cl. 171—95)

The present invention relates to arrangements for measuring electric power, and concerns particularly, though not exclusively, measurements of the power present in high frequency electric waves.

A substitution method is adopted whereby a bolometer lamp or other temperature dependent resistance connected in a Wheatstone bridge is heated by a local current to a suitable temperature indicated by its resistance as measured in the bridge. The power to be measured is then supplied suitably to the lamp and the local current reduced until the lamp is at the same temperature as before. By suitably proportioning the arms of the bridge the change in the locally supplied power (which is equal to the power being measured) may be made proportional to the change in power in another fixed resistance arm of the bridge, independently of the resistance of the bolometer lamp, which therefore does not need to be known. The manner of proportioning the bridge will be explained in detail below.

The invention is of particular interest in measuring power at very high frequencies, a problem which presents special difficulties, but its application is quite general, and may be used under a variety of different circumstances, and with currents of low as well as high frequencies.

One of the advantages of the arrangement is that it can easily be made direct reading, which facility largely results from the fact that the measurement does not depend on a knowledge of resistance of the bolometer lamp. Another advantage is that for a similar reason the accuracy of the measurement is not affected by changes in the temperature of the surroundings of the lamp which affect its "zero" resistance, so no corrections are necessary for this source of variation, provided large temperature changes do not take place during the actual measurement.

The invention accordingly provides an arrangement for measuring electric power comprising a fixed resistance, a temperature-dependent resistance, and two simultaneously adjustable resistances arranged in the arms of a Wheatstone bridge, means for supplying current to one pair of diagonal points of the bridge, and means connected to the other pair of diagonal points thereof for detecting the degree of unbalance of the bridge, the arrangement being such that after the bridge has been balanced by the adjustment of the simultaneously adjustable resistances, the power dissipated in the temperature-dependent resistance is directly proportional to the power dissipated in the fixed resistance, and is independent of the resistance of the temperature-dependent resistance, the arrangement also comprising means for measuring the power dissipated in the said fixed resistance, and means for subjecting the temperature-dependent resistance to the waves or currents whose power is to be measured.

Rather more specifically the invention provides an arrangement for measuring electric power comprising a pair of resistance elements respectively connected in two opposite arms of a Wheatstone bridge network and simultaneously adjustable in such manner that their resistances remain in a fixed ratio, a temperature-dependent resistance element connected in a third arm of the bridge, fixed resistance means connected in the fourth arm thereof, means for supply input electric current to one pair of diagonal points of the bridge, means for detecting the difference of potential between the other pair of diagonal points, and means for subjecting the temperature-dependent resistance element to the waves or currents whose power is to be measured, the said fixed resistance means including means for indicating the power dissipated in the said fourth arm.

Figure 2:
Figure 3:
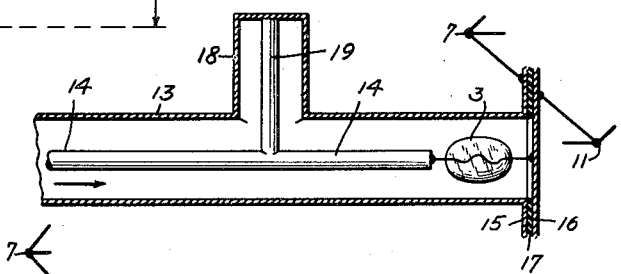
Figure 3:
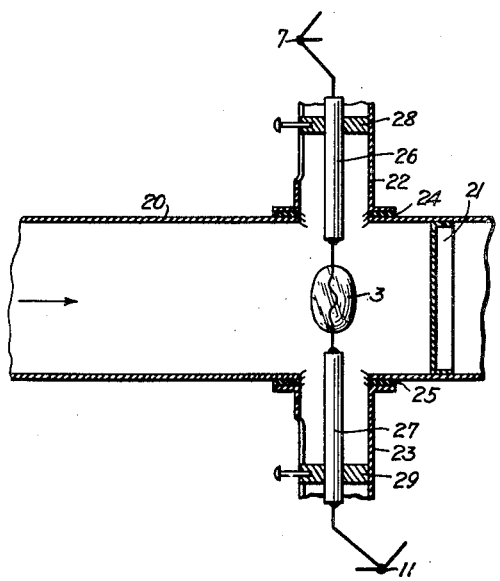
Figure 4:
Figure 4:
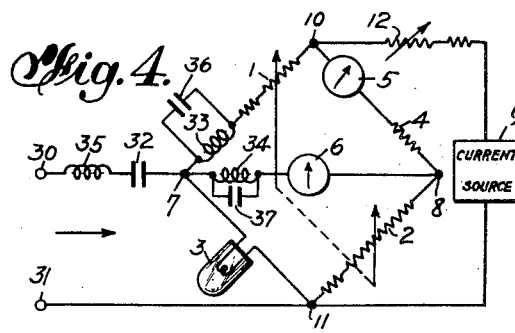

The invention will be described with reference to the accompanying drawing in which:

Fig. 1 shows a schematic circuit diagram of a bridge circuit according to the invention to illustrate the principles; and Figs. 2, 3 and 4 show diagrams of three different applications of the measuring bridge according to Fig. 1.

Referring to Fig. 1, a Wheatstone bridge network of the ordinary type is formed by two adjustable resistance elements 1 and 2 occupying two opposite arms, a temperature sensitive resistance such as a bolometer lamp 3 occupying a third arm, and a fixed resistance element 4 connected in series with a current measuring instrument 5 in the fourth arm. The usual galvanometer 6 connects the diagonal points 7 and 8 of the bridge, and a current source 9 is connected to the other two diagonal points 10 and 11, an adjustable resistance 12 being connected in series between the source 9 and the point 10 as shown, for the purpose of adjusting the input current from the source 9 to the bridge. Any other suitable means for adjusting the input current could be used. The controls of the adjustable resistance elements 1 and 2 should be linked so that their resistance ratio remains constant.

Let $R_1$ and $R_2$ be the resistances of the elements 1 and 2; let $R_3$ be the resistance of the lamp 3 and let $R_4$ be the combined resistance of the element 4 and instrument 5. Suppose that the bridge is balanced in the usual way by adjusting the elements 1 and 2. Let V be the voltage across the diagonal points 10 and 11 as shown. Let $R_1/R_2=k$, where $k$ is a numerical constant.

Then the power dissipated in the bolometer lamp 3 is $$W_3 = V^2 R_3 / (R_1 + R_3)^2$$

and the power dissipated in the arm containing the elements 4 and 5 is $$W_4 = V^2 R_4 / (R_2 + R_4)^2$$

But since the bridge has been balanced $$R_4/(R_2+R_4) = R_1/(R_3+R_1)$$

so that $$W_4/W_3 = R_1^2/R_3 R_4 = R_1/R_2 = k$$

since $R_3 R_4 = R_1 R_2$.

It thus follows that the ratio of the powers dissipated in the resistances $R_4$ and $R_3$ is equal to the constant $k$ and does not depend on the value of $R_3$.

If I is the current measured by the instrument 5 then $W_4 = I^2 R_4$.

Thus $W_3 = I^2 R_4/k$, and since $R_4$ and $k$ are both constants, the power dissipated in the bolometer lamp 3 is proportional to $I^2$ and does not depend on its resistance $R_3$. The instrument 5 may evidently be calibrated directly to read this power, and if it is a square-law instrument the power scale will be linear.

The arrangement is employed in the following way. First the bridge is balanced by means of the coupled elements 1 and 2, using a convenient value of I, which may be adjusted by means of the element 12. The bolometer lamp 3 is then subjected to the energy to be measured in some suitable way, examples of which will be given later. The resistance of the lamp will thereby be changed, and the element 12 is then adjusted to reduce the current I appropriately until the bridge is again balanced. This means that the total power dissipated in the lamp 3 is the same as in the preliminary adjustment, so that the power being measured is equal to the difference between the two power readings of the instrument 5. As the readings do not depend on the resistance of the lamp 3, the accuracy is not affected by changes in the lamp, nor by replacements, nor by changes in the air temperature.

It is obvious, of course, that the value of the current I chosen for the initial balance should be such that the power $W_4/k$ is greater than the power which is to be measured.

The resistance elements 1 and 2, for convenience, may each be divided into a fixed and a variable portion, the resistances of the two fixed portions being in the fixed ratio $k$, and the two variable portions being mechanically connected so that their resistances are also in the ratio $k$. This may be useful if a fine adjustment over a limited range is desired. Likewise the element 12 may consist of fixed and variable portions. This arrangement may also facilitate the use of a relatively cheap construction for the adjustable portions of the resistance elements.

The accuracy of the arrangement depends on the following three factors, all of which can be controlled to any degree of precision desired:

(1) The calibration of the instrument 5
(2) The value of the fixed resistance $R_4$
(3) The ratio of the resistances $R_1$ and $R_2$ In practice, it will be seldom necessary to demand an accuracy better than about 1% in any of these factors.

The necessary range of variation of the resistances $R_1$ and $R_2$ depends on the variations to be expected in the bolometer lamp 3 or other temperature sensitive resistance, and this range will generally be quite small unless the arrangement is expected to deal with a series of different types of bolometer.

An example of a bridge according to the invention adapted to measure powers up to about 450 microwatts will be given.

The elements used were as follows:

Element 1: Fixed portion 200 ohms; variable portion 0 to 50 ohms.

Element 2: Fixed portion 20 ohms; variable portion 0 to 5 ohms.

Element 3: Bolometer lamp having resistance between 20 and 30 ohms when dissipating 500 microwatts.

Elements 4 and 5: Combined resistance 200 ohms.

Element 12: Fixed portion 450 ohms; variable portion 0 to 6000 ohms.

Element 5: Moving coil D. C. instrument range 0 to 5 milliamperes.

Element 6: Moving coil D. C. centre zero instrument range 60–0–60 microamperes.

Voltage of source 9: 6 volts D. C.

The instrument 5 was calibrated to read zero microwatts at the deflection 5 mA. and 480 microwatts at the deflection 1 mA.

Thus $k=10$ and $W_4=5,000$ microwatts.

As already mentioned any suitable temperature sensitive resistance may be used for the element 3. In some cases a directly heated thermistor may be suitable and the high temperature co-efficient characteristic of this type of resistance will result in a sensitive arrangement. It is to be noted that the resistance of the element 3 may have a positive or a negative temperature co-efficient.

Figs. 2, 3 and 4 show three examples of the application of the bridge circuit of Fig. 1 to the measurement of electric power. In Figs. 2 and 3 only the points 7 and 11 of the bridge are shown, in order to indicate the manner in which the bolometer lamp 3 is connected between these two points. The rest of the bridge is as described in connection with Fig. 1.

Referring to Fig. 2, the receiving end of a co-axial transmission line or wave guide is shown, consisting of an outer metal casing 13 having a central conductor 14. The casing 13 terminates in a flange 15 and is closed by a metal plate 16 which is insulated from the flange by an annular disc 17 of mica or other suitable thin insulating material. The central conductor 14 is connected to the centre of the plate 16 by means of the bolometer lamp 3 (or other suitable temperature sensitive resistance). A side tube 18 contains a central conductor 19 connected to the conductor 14. High frequency waves are supposed to be arriving from the left-hand end of the wave guide 13, 14 and their energy is absorbed by the bolometer lamp 3. The length of the transmission line 18, 19 should be equal to a quarter of the wave length of the high frequency waves so that it presents a substantially infinite impedance to the waves arriving from the left-hand side, so that none of them are diverted thereto. The points 7 and 11 of the Wheatstone bridge are connected respectively to the flange 15 and to the plate 16. It will be seen that the purpose of the side tube is to complete the connection from the point 7 to the bolometer lamp through the conductors 19 and 14 without producing any appreciable loss of the high frequency waves. A by-pass condenser for these waves is provided by the flange 15, plate 16 and insulating disc 17 so that the plate 16 substantially closes the end of the guide for the high frequency waves without short-circuiting the points 7 and 11. The side tube may be provided with a suitable tuning piston (not shown), according to well known practice, for adjusting its length precisely to a quarter wave length.

Fig. 3 shows the receiving end of a wave guide 20 without a central conductor, the high frequency waves being supposed to arrive from the left-hand side. The guide is closed at the right-hand end by an adjustable piston 21. Two side tubes 22 and 23 are provided, insulated from the guide 20 by suitable mica sheet insulators 24 and 25 or the like, and having central conductors 26 and 27 with tuning pistons 28 and 29. The inner ends of the central conductors are connected by the bolometer lamp 3, and the outer ends are connected respectively to the points 7 and 11 of the Wheatstone bridge. The pistons 21, 28 and 29 are adjusted by methods already well known, so as to absorb substantially the whole of the wave energy in the lamp 3. It will be noted that, as before, the insulators 24 and 25 prevent the points 7 and 11 from being short circuited, and provide at the same time high frequency condensers which connect the side tubes to the walls of the guide 20 for the high frequency waves.

Although Figs. 2 and 3 both give examples where the wave length concerned is very short, say 1 metre or less, yet similar principles may be adopted for measuring low frequency energy, for example where the frequency is of the order of 1000 cycles per second, or lower. An example is shown in Fig. 4. Low frequency waves are applied at terminals 30 and 31. The lamp 3 or a directly heated thermistor, for example, is connected between the points 7 and 11 as before. The terminal 30 is connected through a large condenser 32 to the point 7, and the terminal 31 is connected directly to the point 11. Inductances 33 and 34 are connected in series with the resistance element 1 and with the galvanometer 6, respectively. It will be seen that these inductances substantially excludes the incoming waves from the bridge network and the condenser 32 prevents the bridge currents from flowing into the alternating current circuit. The arrangement will be seen to be a simple means of separating the two sets of currents. If the incoming waves consist only of a single frequency, the inductances 33 and 34 could be shunted by suitable condensers 36 and 37 so as to form parallel resonant circuits tuned to the incoming frequency; and/or a suitable inductance 35 could be connected in series with the condenser 32 to tune it to the incoming frequency. The resistance of the inductance 33 may be considered as included in the element 1, or alternatively, a compensating fixed resistance element (not shown) may be connected in series with the element 2, its resistance being 1/k times that of the inductance 33.

Although the source 9 for the Wheatstone bridge will most usually be a direct current source, this is not essential. It could be an alternating current source having a frequency sufficiently far removed from the frequency of the waves whose power is being measured to enable the necessary separation to be satisfactorily accomplished. In the case of Fig. 2, or 3, the source 9 could be an oscillator supplying current at 1000 cycles per second, for example, and the galvanometer 6 could then be replaced by a telephone receiver, or other alternating current detector. In the case of Fig. 4, for example, the bridge frequency could be an audio frequency and the frequency of the incoming waves could be a low carrier frequency, in which case it might be necessary to replace the condenser 32 and inductances 33 and 34 by a more complicated separating filter system, according to well known practice. It is to be noted that the frequency of the source 9 is not necessarily below that of the waves being measured, though it most usually will be.

What is claimed is:

1. An arrangement for measuring electric power comprising a fixed resistance connected in one arm of a Wheatstone bridge, a temperature dependent resistance connected in the arm opposite to said one arm of said Wheatstone bridge, two adjustable resistances connected in the remaining two opposite arms of said Wheatstone bridge, means for simultaneously adjusting said adjustable resistances so as to maintain their ratio constant, means for supplying input electric current to one pair of diagonal points of said bridge, means connected between the other pair of diagonal points for detecting the difference of potential, means for subjecting the temperature dependent resistance to the electric waves whose power is to be measured, and means for measuring the power dissipated in said fixed resistance, said adjustable resistances being adjusted whereby said bridge is balanced and the power dissipated in said temperature dependent resistance is directly proportional to the power dissipated in said fixed resistance.

2. An arrangement according to claim 1 in which said means for subjecting comprises a coaxial transmission line for supplying the electric waves whose power is to be measured, a plate insulated from the outer conductor of said line for closing said line, said temperature dependent resistance being connected in series between the central conductor of said line and said plate, and a branch coaxial line connected to said transmission line, said branch line being short circuited at the end and being of length substantially equal to one quarter of the wavelength of the said waves, said temperature dependent resistance and said bridge being connected through said plate and the outer conductor of said line.

3. An arrangement according to claim 1 in which said means for subjecting comprises a tubular wave guide for supplying the electric waves whose power is to be measured, an adjustable piston for closing said guide, a pair of coaxial transmission lines coupled to said guide on either side near the closed end, adjustable means for short circuiting said lines at their outer ends, and means for insulating said lines from said guide, the temperature dependent resistance being connected inside said guide between the central conductors of said lines, the bridge and said temperature dependent resistance being connected together through said lines, the lengths of said lines and the position of said piston being adjusted whereby substantially all the power of said waves is absorbed by said temperature dependent resistance.

4. An arrangement according to claim 1 further comprising means for excluding the electric waves from the input current, said excluding means being connected in the bridge between the points where input current is supplied and the temperature dependent resistance and comprising an inductance coil connected in series between the supplying means and said temperature dependent resistance and a condenser shunting set coil, said coil and condenser being tuned to the frequency of the electric waves.

5. An arrangement according to claim 1 further comprising means for excluding the input current from the electric waves, said excluding means being connected between said subjecting means and said temperature dependent resistance and comprising a condenser and inductance coil connected in series between said subjecting means and said temperature dependent resistance and tuned to the frequency of the electric waves.

6. An arrangement for measuring electric power comprising a fixed resistance connected in one arm of a Wheatstone bridge, a temperature dependent resistance connected in the arm opposite to said one arm of said Wheatstone bridge, two adjustable resistances connected in the remaining two opposite arms of said Wheatstone bridge, said adjustable resistances each comprising a fixed portion and a variable portion, said fixed portions being in a fixed ratio, means for simultaneously varying said variable portions and for maintaining them in a fixed ratio, means for supplying input current to one pair of diagonal points of said bridge, means connecting said supplying means to said one pair of points for adjusting the input current, means connected between the other pair of diagonal points for detecting the difference of potential, means for subjecting the temperature dependent resistance to the electric waves whose power is to be measured, a first means for excluding the input current from the electric waves, said first excluding means being connected between said subjecting means and said temperature dependent resistance, a second means for excluding the electric waves from the input current, said second excluding means being connected in the bridge between the points where input current is supplied and the temperature dependent resistance, and means for measuring the power dissipated in said fixed resistance, said adjustable resistances being adjusted whereby said bridge is balanced and the power dissipated in said temperature dependent resistance is directly proportional to the power dissipated in said fixed resistance.

7. An arrangement according to claim 1 in which said means for subjecting comprises a tubular wave guide for supplying the electric waves whose power is to be measured, an adjustable piston for closing said guide, a pair of coaxial transmission lines coupled to said guide on either side near the closed end, adjustable means for short circuiting said lines at their outer ends, and means for insulating said lines from said guide, the temperature dependent resistance being connected inside said guide between the central conductors of said lines, the bridge and said temperature dependent resistance being connected together through said lines, the lengths of said lines and the position of said piston being adjusted whereby substantially all the power of said waves is absorbed by said temperature dependent resistance.

WILLIAM ALAN MONTGOMERY.

REFERENCES CITED

The following references are of record in the file of this patent:

UNITED STATES PATENTS

| Number | Name | Date |
|---|---|---|
| 1,590,420 | Chubb | June 29, 1926 |
| 1,901,741 | Fetsch | Mar. 14, 1933 |
| 2,387,158 | Kozanowski | Oct. 16, 1945 |
| 2,399,481 | George | Apr. 30, 1946 |
| 2,399,674 | Harrison | May 7, 1946 |
| 2,417,820 | Ginzton | Mar. 25, 1947 |